US007843360B2

(12) United States Patent
Ponziani

(10) Patent No.: US 7,843,360 B2
(45) Date of Patent: Nov. 30, 2010

(54) LANE CHANGE TURN SIGNAL APPROPRIATE USE REMINDER SYSTEM

(76) Inventor: Richard Louis Ponziani, 1958 Home Path Ct., Centerville, OH (US) 45459

( * ) Notice: Subject to any disclaimer, the term of this patent is extended or adjusted under 35 U.S.C. 154(b) by 284 days.

(21) Appl. No.: 12/077,856

(22) Filed: Mar. 21, 2008

(65) Prior Publication Data

US 2009/0237230 A1 Sep. 24, 2009

(51) Int. Cl.
*G08G 1/00* (2006.01)
(52) U.S. Cl. .................. 340/901; 340/439; 340/457; 340/465; 340/475; 340/904
(58) Field of Classification Search ......... 340/901–905, 340/435–439, 576, 457, 463–465, 937; 701/28–41, 701/301
See application file for complete search history.

(56) References Cited

U.S. PATENT DOCUMENTS

| | | | |
|---|---|---|---|
| 5,689,249 A | 11/1997 | Sakamoto | |
| 6,057,754 A | 5/2000 | Kinoshita | |
| 6,498,570 B2 | 12/2002 | Ross | |
| 6,502,035 B2 * | 12/2002 | Levine | 701/301 |
| 6,741,186 B2 | 5/2004 | Ross | |
| 6,748,302 B2 | 6/2004 | Kawazoe | |
| 6,753,766 B2 * | 6/2004 | Patchell | 340/436 |
| 6,842,687 B2 | 1/2005 | Winner | |
| 6,975,218 B2 | 12/2005 | Madau | |
| 7,038,577 B2 | 5/2006 | Pawlicki | |
| 7,091,838 B2 * | 8/2006 | Shimakage | 340/436 |
| 7,206,684 B2 | 4/2007 | Takeda | |
| 7,269,493 B2 | 9/2007 | Uemura | |
| 7,382,236 B2 * | 6/2008 | Maass et al. | 340/436 |
| 7,479,892 B2 * | 1/2009 | Ling et al. | 340/576 |
| 7,482,916 B2 * | 1/2009 | Au et al. | 340/475 |
| 2007/0069874 A1 | 3/2007 | Huang | |
| 2008/0129481 A1 * | 6/2008 | Zumbrunnen et al. | 340/457 |

OTHER PUBLICATIONS

U.S. Appl. No. 12/070,169, filed Feb. 16, 2008, Ponziani.

* cited by examiner

*Primary Examiner*—Brent Swarthout

(57) ABSTRACT

A vehicle safety system to improve lane change turn signal use by creating a conditioned response in the driver of a motor vehicle such that turn signals are used more appropriately over time for changing lanes. This is achieved using existing lane departure warning components and comparing each lane change at lower speeds to the coinciding turn signal on/off status, and determining if turn signal usage was appropriate. If lane changes indicate repeated, neglectful turn signal usage, a reminder message is presented to the driver. The lane departure warning remains functional at higher speeds, but at lower speeds, the present invention provides a less abrupt, friendly reminder message to use turn signals for lane changes. Drivers who repeatedly neglect to use turn signals will over time increase usage and reminder messages will cease, thereby improving vehicle safety by increasing appropriate turn signal use while changing lanes.

10 Claims, 2 Drawing Sheets

LANE CHANGE TURN SIGNAL APPROPRIATE USE REMINDER SYSTEM

BACKGROUND OF THE INVENTION

This invention relates in general to motor vehicle lighting safety systems, and more particularly related to turn signals.

Motor vehicles sold in the United States are required by law to have a turn signal system such that a driver of a motor vehicle is able to signal intentions of an impending turn to other drivers. A secondary function of the turn signal system is that it is used for signaling lane changes on a multilane roadway or a multilane highway. Signaling a lane change before the lane change occurs is courteous to other drivers, reduces the risk of an accident, and is usually required by law in most jurisdictions.

Lane departure warning systems (LDW) and lane departure prevention systems (LDP) have been developed and implemented on motor vehicles where a forward viewing image processing system and computer software detect the dashed and solid painted road lines when they are present and visible. If the vehicle ventures too far out of the original lane of travel, then the driver is instantly alerted by tactile, visual or audible means to the impending unintended lane departure. The driver can then correct the situation by steering the vehicle back into the original lane. In the event of a driver-intended lane change, usage of the turn signal would trigger the LDW system that the lane change is indeed intentional and would therefore not send a warning alert to the driver. A secondary benefit of the LDW system has been advocated which is that the LDW promotes the use of the turn signal for lane changes.

LDW systems are primarily intended for interstate highway use where driving for long periods of time can be somewhat hypnotic to the driver and there is a higher likelihood of an unintended roadway departure due to fatigue and the effects on humans of extended drowse-inducing driving. The LDW warning that is communicated to the driver is intended to be instantaneous, abrupt, and disruptive such that the driver will be immediately alerted in time to take sufficient countermeasures to prevent an accident. In contrast, driving on lower speed multi-lane roadways, such as those typically with posted speed limits below 55 miles per hour are usually less drowse-inducing, in part due to the continuously changing conditions presented to the driver. In situations where there are lower speed limit multi-lane roadways, it remains important that the driver properly utilize the lane change turn signal when changing lanes for reasons of safety and as a courtesy to other drivers. LDW systems are capable of detecting the lanes and lane changes on lower speed roadways, but the instant and abrupt warning is not appropriate because the lack of lane change turn signal on the part of the driver is usually not from a driver dozing condition, but is due to a neglect on the part of the fully alert driver to use the turn signal. Therefore, the startling warning would become viewed as a nuisance to most drivers, not a reminder to use the turn signal when changing lanes. For this reason, most LDW systems to date have been designed such that a minimum vehicle velocity threshold is required wherein the full communication abrupt warning is ready to be activated, and below that velocity, the warning means is either deactivated or is designed to instantly communicate a lesser level of warning. Some manufacturers have designed their systems such that they have no warning what so ever below the threshold velocity, while others, may present a visual warning at each detected lane departure, but do not present the audible or tactile warning that would be present at higher vehicle velocities.

The problem with the methods currently in use in these LDW systems is that some level of warnings are presented each and every time the driver departs the original lane without the use of a turn signal. Ideally in the lower speed circumstances, any warning that would be designed by the manufacturer to alert the driver from a LDW system should be designed as a reminder to use a turn signal when changing lanes rather than how it is designed today where a warning is presented that alerts and/or calls for immediate action from the driver. Warnings of any kind being presented each time at the lower speeds would be considered an excessive distraction to most drivers. There are some circumstances where a turn signal may not necessarily be appropriate and hence the driver could easily become annoyed at a warning system that is relentlessly alerting in every instance. In most vehicles, the LDW system can be selected by the driver to be shut off, and it would be conceivable that a system that is viewed as an annoyance would be promptly shut off by the driver. This action is counterproductive to the goal of encouraging turn signal usage at all speeds with the LDW.

What is needed is a system whereby the LDW communication to the driver at lower vehicle velocities that is not abrupt but is appropriate to encourage and remind the driver of using the turn signal during lane changes without the reminder becoming an annoyance and without occurring in every instance. Such a system would be perceived by the driver as a reminder for future lane changes with turn signal usage and not a warning that calls for immediate action from the driver.

BRIEF SUMMARY OF THE INVENTION

It is an objective of the present invention to encourage and remind drivers of motor vehicles equipped with LDW systems to use turn signals when changing lanes at lower vehicle velocities. It is also an objective that only drivers who habitually and repeatedly neglect to use turn signals when changing lanes would receive a reminder to use turn signals in future lane change maneuvers. It is further an objective that the driver who uses turn signals for lane change maneuvers most of the time, but occasionally does not use it would never receive a reminder. Another objective of the present invention is that the driver would not consider the reminder system to be an annoyance and would therefore not be inclined to shut off the system.

The present invention is directed to a lane change turn signal reminder system that it would utilize the LDW imaging and processing system to detect lanes and vehicle position in a roadway, detect vehicle velocity and decide when a lane change turn signal would be appropriate. Further, a sufficient number of lane changes in the absence of a driver actuated turn signal would eventually trigger a communication reminder message to the driver that suggests the use of the turn signal next time a lane change maneuver is executed. The frequency of reminder messages is such that the LDW system would not become an annoyance. The driver will eventually act accordingly to avoid receiving subsequent reminders by increasing the use of lane change turn signals.

Further, the present invention is implemented such that the reminder does not occur every time a lane change is executed without a turn signal. The system keeps a running recent history recording of lane changes along with the coinciding turn signal on or off status. In the event that the proportion of lane changes that do not coincide with a turn signal as compared to the total lane changes considered exceed a predetermined threshold, then and only then is a reminder message conveyed to the driver. Any such reminder is presented after the lane change is completed.

Other aspects of the systems and/or methods according to the embodiments will be or become apparent to one with skill in the art upon review of the following drawings and detailed description. It is intended that all such additional systems and/or methods be within the scope of the present invention, and be protected by the accompanying claims.

DETAILED DESCRIPTION OF THE INVENTION

It should be noted that lane change turn signal appropriate use determination according to the present invention is independent of whether the vehicle executed a left or a right lane change, but only whether the use of the lane change turn signal was appropriate for the situation. A lane change is defined as a vehicle shift from the original roadway lane that the vehicle is presently in to either a left side or right side adjacent lane. A qualified lane change is a complete lane change from an original lane to an adjacent lane executed by the motor vehicle, and not a situation where a vehicle drifts part way into an adjacent lane, then is corrected by the driver steering the vehicle back into the original lane. When a lane change is completed, then the adjacent lane becomes the new original lane with regards to future lane changes. A driver is one who operates a motor vehicle and is in control of the travel path and lane selection of the motor vehicle as well as one who controls the on or off status of the turn signal. A turn signal is a commonly known driver actuated lighting system used for both turns and lane changes by which a vehicle's external flashing lights forewarns of its intended path to other drivers. For all descriptions relating to the present invention, lane departure warning systems and lane departure prevention systems are used interchangeably.

Figure 1:
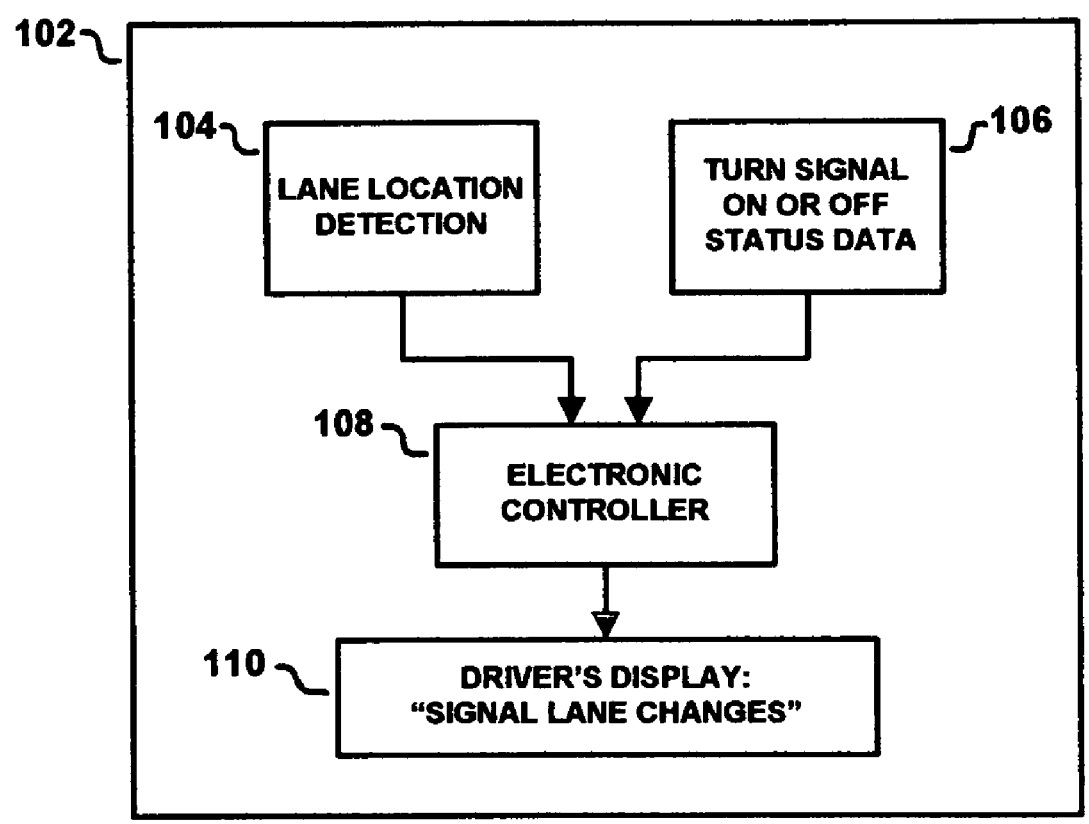
FIG. 1 illustrates a functional block diagram of the lane change turn signal monitoring and appropriate use reminder system.

Referring now to the drawings, the lane change turn signal monitoring and appropriate use reminder system block diagram is illustrated in block 102 of FIG. 1. A means for image detecting and compiling lane location data of the vehicle is represented in block 104. A means for detecting turn signal on or off status of the turn signal is represented in block 106. Both data outputs from block 104 and block 106 are directed to block 108, and electronic controller. An electronic controller such as that depicted in block 108 can comprise a vehicle body computer, a dedicated computer for a LDW system or some other means of comparing data, manipulating data, and controlling functions. Within block 108, the system is programmed to process vehicle location image data within a visibly recognizable roadway lane and adjacent lanes and then compares any specific lane change parameter events with the coinciding on or off status of the turn signal. The specific parameters stated will be further explained in the discussion relating to FIG. 2. Lane change events that do not coincide with a driver-actuated lane change turn signal are recorded as such and conversely, turn signal events that do coincide with to a driver-actuated lane change turn signal are recorded as well. Also occurring within block 108 would be a record of a running history of each qualifying lane change and its coinciding lane change turn signal on or off status, the details of which will be further explained in the discussion relating to FIG. 2. When the system decides that a sufficient proportion of qualified lane changes were not represented by a coinciding driver-actuated lane change turn signal, then it is determined that the driver is repeatedly neglectful of using the turn signal appropriately with respect to lane changes and the electronic controller of block 108 produces a short duration reminder message that is conveyed to the driver in block 110. The message is designed to inform that lane change turn signal usage in the recent past has been inadequate with respect to the recent history of vehicle travel. As each qualifying lane change event occurs without appropriate turn signal usage, then subsequent reminder messages are conveyed to the driver, based upon predetermined criteria. Reminder messages to the driver are intended to affect the driver's future use of turn signals while changing lanes. The driver will therefore strive to eliminate the repeat of reminder messages in the future. This would be achieved by virtue of the driver focusing efforts to utilize the turn signal more appropriately for lane changing as the vehicle is driven.

What takes place over time is an altered behavior from the driver. When a driver receives a reminder message, it is received as a negative stimulus. This results in an elevated level of anxiety within the driver and thus the driver feels a compelling need to respond. The remedy for eliminating subsequent negative stimuli is made apparent to the driver via the message presented and consists of more appropriate turn signal usage when changing lanes. The resulting enhanced use of turn signals while lane changing is the conditioned response that becomes a self-motivated, long term, automatic response.

In the present invention, a driver would never receive a reminder message if he or she appropriately uses turn signals nearly 100% of the time when changing lanes. Referring again to FIG. 1, recall that in block 108, a record is kept of a running history of qualifying lane changes and their coinciding turn signal on or off status. In the event that a sufficient portion of qualified lane changes are indeed represented by a coinciding driver-actuated turn signal, then no reminder warning is ever given. As an illustration by way of example, assume that the running history consists of a fixed quantity of 10 qualified lane change events, and that the threshold value that would yield a reminder message is a quantity of 3 turn-signal-absent-lane-changes within the 10. If a driver fails to use the lane change turn signal once or even twice within the preceding 10 detected lane changes, then no reminder message is presented to the driver. The threshold value of 3 and quantity of running history turns of 10 used in this example are optional values and may be altered within programming as set forth from the vehicle manufacturer. For the example with a fixed quantity 10 running history, threshold values greater than 3 would generally result in fewer reminder messages, while threshold values of less than 3 would generally result in more frequent reminder messages. Details of the running history method will be further explained in the discussion relating to FIG. 2

Referring once again to block 110 in FIG. 1, the method of presenting the message to the driver is at the discretion of the manufacturer. The message could be in a format of a visual, an audible, or a tactile means, or in any combination of one or more of these. Since the present invention is intended to provide a reminder to the driver and not necessarily a warning, by way of suggestion, an appropriate visual message might be one such as "SIGNAL LANE CHANGES". This message in particular would fit within a 20 character display.

Other messages may comprise the following content: "USE TURN SIGNAL FOR LANE CHANGES"; "PLEASE USE SIGNAL FOR LANE CHANGES". Such a message would be presented, then extinguish itself within a fixed limited time. The message would be presented as soon as the qualifying lane change is completed, and suggested time duration for the message would be about 4 to 12 seconds. In keeping within the scope of the message being a reminder and not necessarily a warning, having the message illuminated in an amber color would be recommended in the present invention, whereas other colors such as red or green would also be acceptable. Ultimately, message content, format, volume, size, color and duration would each be at the discretion of the manufacturer.

In the case of a vehicle with a message-changeable driver information display, this could be an ideal format for conveying the reminder message because the reminder system of this invention can be integrated into the vehicle in part by altering the display's programming, thereby avoiding any tooling costs or physical revisions to a driver's instrument cluster. If a message-changeable driver information display is not a practical medium, then a dedicated indicator light or other display could alternatively be used.

Figure 2:
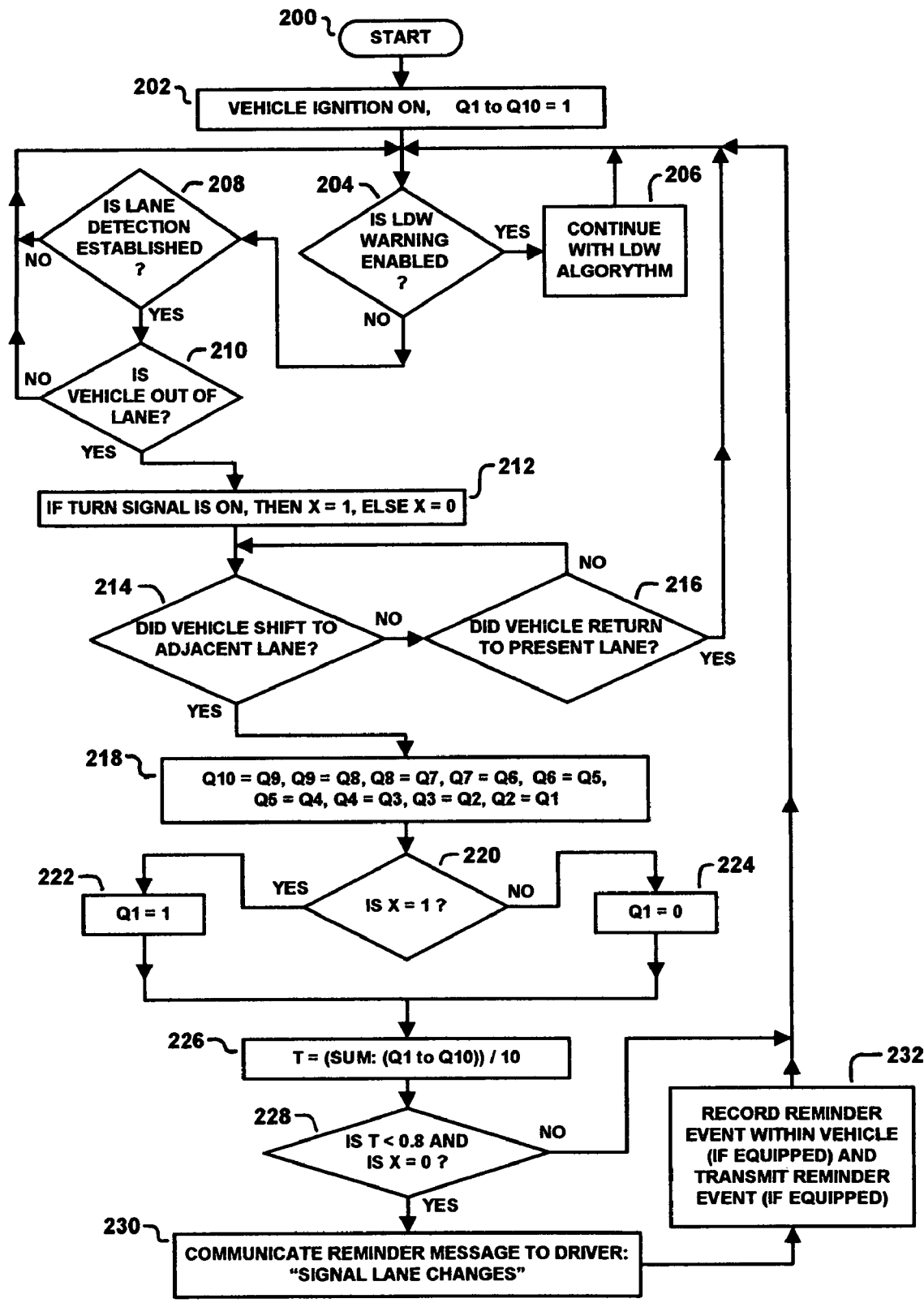
FIG. 2 depicts a basic version of the flow chart of events used by the lane change turn signal monitoring and appropriate use reminder system for conditioning a driver's long term lane change turn signal usage behavior.

Referring now to the block diagram flow chart illustrated in FIG. 2, starting in step 200 and proceeding to step 202, as the ignition of the vehicle is turned on, values representing the running history of qualified lane changes and represented by Q1 through Q10 would each be initially set to a value of 1. In this example, values of Q are used to record the last ten qualified lane changes that are made by the vehicle, regardless of total distance traveled. In the illustration of FIG. 2, the last 10 qualified lane changes are recorded and any Q value of one (1) would represent a qualified lane change in combination with a coinciding turn signal "on" status. Conversely, any Q value of zero (0) would represent a qualified lane change in combination with a coinciding turn signal "off" status. By setting all Q values to 1 upon ignition turn on, the reminder system is initialized reflecting no lane change turn signal neglect.

Next, the logic flows from step 202 to step 204. If the full LDW system is enabled, as determined by the LDW software, then the logic flow moves to 206 wherein the LDW algorithm is in control at a velocity above the threshold value, waiting for lane recognition and ready to present an instantaneous and abrupt warning to alert the driver of an unintended lane drift. If in step 204, the full LDW is not enabled, then the logic flow moves to step 208.

Continuing then to step 208, the image detection system, which can constitute the same components and software used for image detection in the LDW system, is establishing a detection of the lanes ahead. If the lanes are not detected in step 208, then the logic flows back to step 204 to detect if the full LDW system is enabled. If in step 208, the vehicles lane position is monitored and established by the image detection system, then the logic flows to step 210 to detect if the vehicle is venturing out of the original lane. If not, then the logic flows back to step 204 to detect if the full LDW system is enabled. If in step 210, however, the vehicle is detected to be out of the original lane, then the logic flow moves to step 212 where the turn signal on or off status is determined for the coinciding out of lane situation of the vehicle. A value of X is used to represent the on or off status of the turn signal and its value will be used later in FIG. 2. If the turn signal is on, then X=1, and if the turn signal is off, then X=0. Note that the establishment of turn signal status is recorded at the onset of the lane change, without regard as to whether the current lane change will ultimately result in a qualified lane change or if the driver will correct the lane drift and move back into the original lane; however establishment of a coinciding turn signal on or off status can be designed to occur at any point in the lane change and those skilled in the art can modify the programming to accommodate this measurement point.

Logic flow now moves from step 212 to step 214, where a determination is made if the detected onset of a lane change will result in a qualified lane change to an adjacent lane. Until a qualified lane change is established within step 214, the lane position is monitored between steps 214 and 216 in a repeated loop. If the vehicle is returned to the original lane, then the logic flow moves from step 216 back to step 204 and a qualified lane change is never established in that cycle. If however, a qualified lane change to an adjacent lane is indeed established within step 214, then the logic flow moves from step 214 to step 218.

In step 218, a form of register shift occurs where current Q10 is eliminated by redefining Q10 as Q9, or Q10=Q9. Q9 through Q2 are redefined as well: Q9=Q8, Q8=Q7, Q7=Q6, Q6=Q5, Q5=Q4, Q4=Q3, Q3=Q2, and Q2=Q1. This makes way for a new value of Q1, which would be established based on the outcome in steps 220, 222 and 224. If X=1 as determined in step 220, then the logic flow moves from step 220 to step 222, where Q1=1 and the logic flow proceeds to step 226. If X=0, that is, X is not equal to one as determined in step 220, then the logic flow moves from step 220 to step 224, where Q1=0 and the logic flow also proceeds to step 226.

In step 226, a value of T is established, where T is a proportion calculation consisting of the number of qualified lane changes that were represented by a coinciding turn signal divided by the number of qualifying lane changes recorded in the recent history, which in this example is a fixed value of 10. The logic flow moves then to step 228 wherein the value of T is examined. If in step 228, T is less than 0.8, that is, qualified turns with less than 80% turn signal usage and the current value of X is equal to zero, then the logic flow moves to step 230. In step 230, a reminder message of fixed limited duration is then presented to the driver. From step 230, the logic flow moves to step 232 where a vehicle, if so equipped, would record the reminder message event for future data access. Such cumulative data could be useful to fleet operators, or owners of vehicles who have a vested interest in how their vehicles are being driven with respect to proper turn signal usage while changing lanes. Alternatively, the reminder message event could be transmitted via radio or satellite to be received elsewhere. From step 232, the logic flow moves then back to step 204 where the process starts over.

Referring again to step 228, the logic flow moves to step 230 only when the X value is equal to zero. This logic ensures that even though T may be below the threshold, that is, T is less than 0.8, thereby indicating a driver who has repeatedly neglected turn signal usage while changing lanes, a reminder message is not presented to the driver who just executed a qualifying lane change and appropriately actuated a coinciding turn signal, where X would be equal to 1, in which case the logic flows from step 228 to step 204. This is in keeping with the spirit of the present invention that would seek to only remind the drivers who do not use a turn signal while changing lanes.

It should be pointed out that the present invention, with a running history and intermittent reminder messages based in part on the running history, is a key element in the present invention that assures that drivers who chronically and repeatedly neglect the appropriate use of turn signals during lane changes are presented timely reminders that will serve to positively change behavior of the driver with respect to future lane changes. The present invention reminds the driver after the lane change is complete and not during the lane change. Conversely, the intermittent reminder feature of the present invention serves to assure that the system will not be considered a nuisance to a driver who practices good turn signal usage during lane changes. A very good driver would never receive a lane change turn signal reminder message in many thousands of miles of driving. Even a good driver may occasionally receive a reminder message, but this will serve as a friendly, no-consequence reminder to further refine his or her driving practices.

Implementation of the present invention is optimized by relying on the usage of existing Lane Departure Warning vehicle component content and processing for maintaining overall system efficiency. Existing image detection system components, bus networks, and driver displays may be utilized.

The present invention is compatible with both major types of turn signal control systems. The traditional, mechanical, fixed shut-off trip turn signals as well as the newer, smart, computer controlled, sensor driven turn signal systems would both require no modifications to achieve compatibility. The superior ergonomics of smart turn signals with regards to lane changes enhances the present invention by further encouraging the use of turn signals when changing lanes. Real time turn signal on or off status information can usually be accessed in many vehicles using communication bus control network systems.

Most LDW systems allow for the driver to disable the LDW system while driving. The lane change reminder system of the present invention is closely related to the LDW system and it would therefore make sense for the lane change reminder system to be activated on or off whenever the LDW system is on or off respectively. However, manufacturers may alternatively choose to incorporate the present invention such that it cannot be disabled by the driver, or could be disabled separately from the LDW system.

The present invention is intended to comply with all Federal Motor Vehicle Safety Standards, specifically FMVSS 108, pertaining to vehicle lighting and turn signals. Additionally, the present invention is intended to comply with current Society of Automotive Engineers' standards and recommended practices pertaining to lighting and turn signals.

The above described embodiments are set forth by way of example and are not for the purpose of limiting the invention. It will be readily apparent to those skilled in the art that obvious modifications, derivations and variations can be made to the embodiments without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A vehicle lane change turn signal monitoring and reminder system comprising: a means of monitoring a vehicle position in a roadway lane; a means of monitoring vehicle turn signal on or off status; a means of comparing said vehicle position in a roadway lane and coinciding said vehicle turn signal on or off status to make a determination of an inappropriate turn signal usage based upon a first predetermined criteria; wherein said first predetermined criteria comprises a completed vehicle lane change and a coinciding turn signal off status; a means of determining if a second predetermined criteria is met based on at least one recent history of said determination outcome of the first predetermined criteria; wherein said second predetermined criteria is a turn signal usage rate that is less than a predetermined threshold; wherein a general usage turn signal reminder suggesting future turn signal usage is initiated after said completed vehicle lane change.

2. The vehicle lane change turn signal monitoring and reminder system of claim 1, wherein said general usage turn signal reminder suggesting future turn signal usage substantially forms the basis for a communication to a driver of the vehicle.

3. The vehicle lane change turn signal monitoring and reminder system of claim 2, wherein said communication can be manually disabled.

4. The vehicle lane change turn signal monitoring and reminder system of claim 2, wherein said communication comprises at least one format selected from the group consisting of an audible format, and a tactile format.

5. The vehicle lane change turn signal monitoring and reminder system of claim 2 wherein said communication comprises a visual format.

6. The vehicle lane change turn signal monitoring and reminder system of claim 5, wherein said visual format is a message-changeable display.

7. The vehicle lane change turn signal monitoring and reminder system of claim 1, wherein said first predetermined criteria comprises at least one input format comprising a vehicle mounted forward facing image detection device.

8. A method of conveying a lane change turn signal reminder message to a driver of a vehicle comprising: configuring a means of monitoring a vehicle position in a roadway lane; configuring a means of monitoring vehicle turn signal on or off status; configuring a means of using a first predetermined criteria to determine inappropriate use of a turn signal, wherein said first predetermined criteria is comprises a completed vehicle lane change and coinciding said vehicle turn signal off status; configuring a means of determining if a second predetermined criteria is met based on at least one recent history said determination outcome of the first predetermined criteria; wherein said second predetermined criteria is a turn signal usage rate that is less than a predetermined threshold; configuring a means of conveying a general usage turn signal reminder message to said driver after completion of a vehicle lane change relating to turn signal usage based upon the outcome of said second predetermined criteria, whereby said message substantially conveys a recommendation for future turn signal usage.

9. The method of claim 8, whereby said driver's future behavior is conditioned to use turn signals more appropriately for lane changes.

10. The method of claim 8, whereby said message can be manually disabled.

* * * * *